Oct. 12, 1926.
B. H. BRITT
1,602,521
BATTERY LIFTING DEVICE
Filed Nov. 8, 1924    2 Sheets-Sheet 2
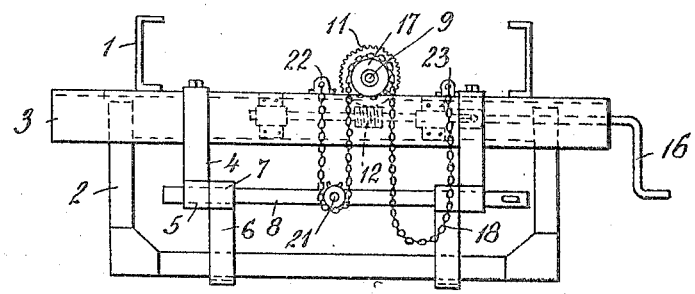
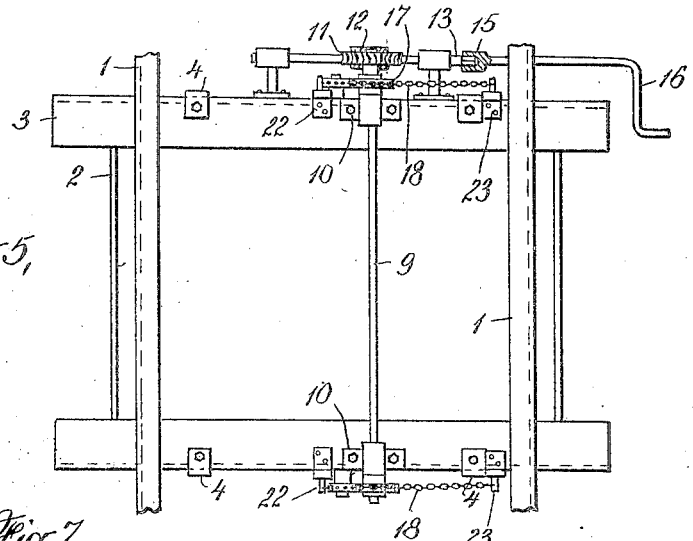
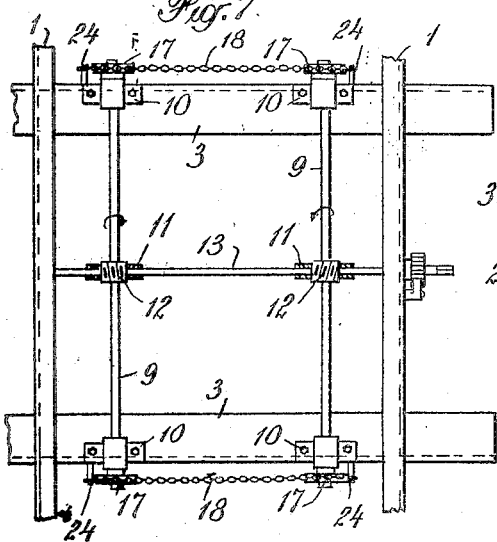
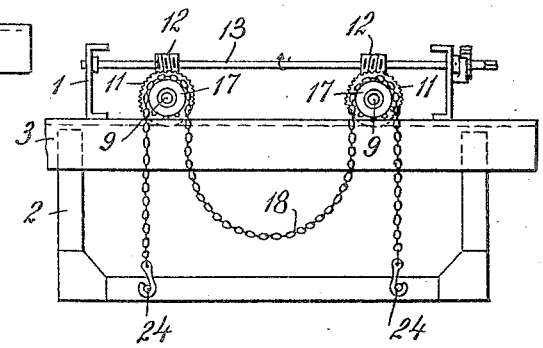
INVENTOR
Benjamin H. Britt
BY
Pennie Davis Marvin & Edmonds
ATTORNEY Patented Oct. 12, 1926.

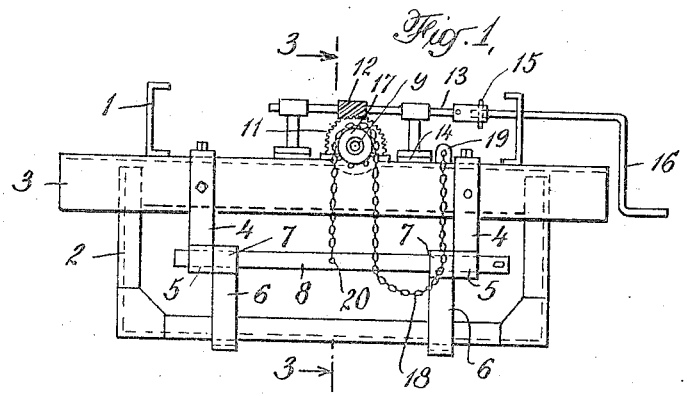
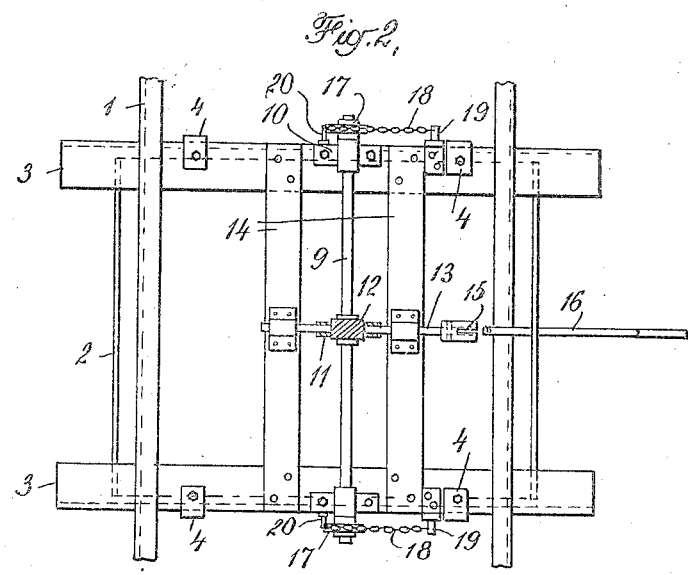
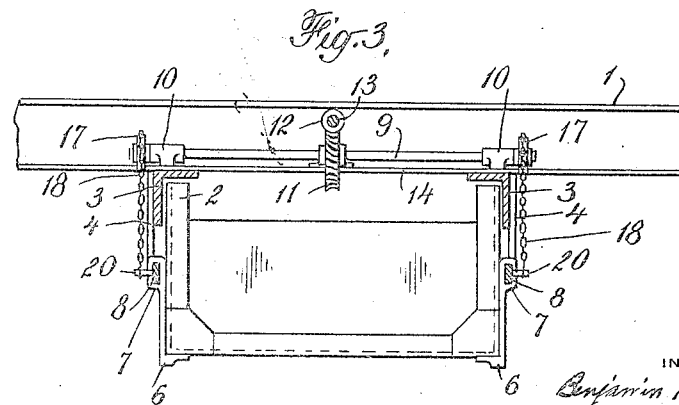

1,602,521

UNITED STATES PATENT OFFICE.

BENJAMIN H. BRITT, OF NEW YORK, N. Y., ASSIGNOR TO ELECTRUCK CORPORATION, OF NEW YORK, N. Y., A CORPORATION OF NEW YORK.

BATTERY-LIFTING DEVICE.

Application filed November 8, 1924. Serial No. 748,580.

The present invention relates to apparatus for handling the storage batteries commonly employed for furnishing the energy required for driving electrically propelled road vehicles. The invention has to do particularly with the lifting of the battery into its place of support on the vehicle and with the removing and lowering of the battery from the vehicle.

At the present time, practically all electrically driven road vehicles are equipped with a storage battery arranged for ready removal from the vehicle to thus facilitate inspection, charging of the battery, and the like. These storage batteries usually consist of a considerable number of individual cells or units placed in closely packed relation in a suitable supporting box or cradle. The battery cradle is provided with hooks or other means of attachment to the vehicle so that it may be secured in place on the vehicle or removed from the vehicle at will. To secure the battery in place the battery unit in its supporting cradle must be moved into position beneath the vehicle and then elevated into such position that the co-operating supporting means provided on the battery and on the vehicle may be brought into engagement. Likewise in removing the battery from the vehicle, it must first be lifted to permit disengagement of its means of attachment to the vehicle, after which it must be carefully lowered to avoid injury to the battery parts.

Manually operated lifting jacks are commonly employed for the purpose of handling the storage batteries. These jacks commonly consist of a low truck platform mounted on wheels to facilitate transportation and have suitable mechanism for elevating or lowering the supporting platform. In removing a battery from a vehicle the truck is wheeled into place beneath the battery suspended from the vehicle and the supporting platform of the truck elevated into contact with the battery until the weight of the battery is supported on the truck instead of being sustained by the vehicle. The means of attachment of the battery to the vehicle are then released, after which the truck with the battery supported on it is lowered.

The necessity of providing handling means for the storage battery is a serious deterrent to an individual truck owner. Lifting jacks or similar battery handling apparatus are expensive and, while the purchase of such apparatus is not a serious inconvenience where a number of trucks have to be serviced, it is a substantially prohibitive expense and inconvenience to a person owning but a single electric truck. This fact works a prejudice against the purchase of electric trucks where only one or two trucks are required.

It is a principal object of this invention to incorporate as a part of the electrically driven vehicle an apparatus for lifting and supporting the vehicle battery. The apparatus may readily be actuated by one person to elevate the battery into position on the vehicle or lower it to the floor or other suitable support. The battery handling apparatus is permanently assembled on the vehicle and is at all times ready for immediate use in raising or lowering the battery.

It is an object of the invention to provide on the vehicle a battery handling apparatus of this nature which is of such low cost that it may be installed on each vehicle at an inconsiderable increase in manufacturing cost over that normally required for the vehicle. In this fashion the necessity of an expensive lifting jack or equivalent battery handling device is eliminated, and the individual owner of one or two trucks is not put to the necessity of investing in a special battery handling unit for the purpose of attending to his storage batteries.

The invention therefore contemplates the provision of an electrically driven vehicle as a part of its regular equipment suitable mechanism to engage and support the vehicle battery and suitable actuating mechanism through which an applied force of small magnitude, such as for instance a manual effort, will serve to lift the battery or lower it from the vehicle as desired. The invention does not reside broadly in a novel mechanism, but relates specifically to the provision of an electrically driven vehicle having permanently assembled upon it a battery handling device of the character described. The purpose of the invention is to avoid in commercial practice the necessity of a separate expensive battery handling unit.

I have illustrated a preferred embodiment of my invention in the accompanying drawings in which Figure 1 is a view taken transversely of a vehicle embodying my invention; Figure 2 is a plan view of the apparatus shown in Figure 1; Figure 3 is a view taken on line 3—3 of Figure ; Figure 4 and 5 are views similar to Figures 1 and 2 respectively illustrating a somewhat different form of apparatus; Figures 6 and 7 are views similar respectively to Figures 1 and 2 showing a further modification.

Referring to the drawings, 1 indicates the frame or chassis of the vehicle and 2 indicates the battery cradle or support which serves to contain the storage battery provided for supplying the driving power for the vehicle. The construction of the battery cradle and the manner of attachment of the battery to the vehicle here shown correspond to the disclosure of the copending application of Walter S. Ward and Benjamin H. Britt, Serial No. 647,997 filed June 27, 1923.

With this arrangement a pair of transversely extending angle irons 3 are secured to the frame members 1 of the vehicle, and depending from the transverse members 3 are supporting bars or straps 4, each provided with loops at its lower end as indicated at 5. The battery cradle 2 is provided with cooperating supporting straps 6 each having a loop 7 at its upper end arranged to be brought into alignment with the loops 5, as indicated in Figure 1, so that a supporting bar 8 may be threaded through the respective loops at opposite sides of the battery cradle 2 to thereby constitute a support for the battery. It will be understood that while the battery handling apparatus of the present invention is particularly designed for use in connection with a battery support of the type shown herein, it is nevertheless equally applicable to the raising and lowering of batteries irrespective of the particular fashion in which the battery is secured to the vehicle for transportation.

The invention contemplates means for engaging the battery and suitable mechanism for raising or lowering of the battery as desired. To this end a chain or other appropriate means of support is arranged to engage with the battery and is also arranged to engage with appropriate mechanism provided on the vehicle frame to effect actuation of the chain to thus move the battery. The actuating mechanism consists preferably of a system of reduction gearing such that vertical movement of the battery may be accomplished by the exertion of a relatively small manual effort, as for instance by the turning of a hand crank.

In the embodiment of Figures 1 to 3 a shaft 9 extends between the transverse supporting members 3 and is free to rotate in its bearings 10 supported on the members 3. Shaft 9 carries at about the middle of its length a worm wheel 11 actuated by a worm 12 provided on a shaft 13 extending transversely of the vehicle and being supported in any desired fashion as for instance by members 14 extending between the transverse supporting members 3. Shaft 13 extends to one side of the vehicle and, as indicated at 15, is provided for attachment to a crank handle 16 which may be manually turned to accomplish elevating of the battery.

At its respective ends the shaft 9 is provided with sprocket wheels 17 which operate chains 18. One end of each of the chains 18 is secured at 19 to the vehicle frame while the other end is attached at 20 to the battery. Upon manual actuation of the crank 16, therefore, shaft 9 will be rotated through the medium of the worm gearing 11 and 12 with the result that sprockets 17 will serve to move the chains 18 and thereby elevate or lower battery cradle 2 depending upon the direction of rotation of the crank 16. The ratio of reduction is such that a reasonable manual effort exerted upon the crank 16 will serve to produce the requisite movement of the battery. We have found that for the provision of an effective inexpensive battery handling device of this nature, it is not ordinarily necessary or advisable to resort to power driven means for elevating or lowering the battery.

The embodiment of Figures 4 and 5 utilizes a sprocket 21 at each side of the battery cradle 2. With this arrangement the respective ends of the chain are preferably secured to the vehicle frame as indicated at 22 and 23. A loop of the chain extends down around sprocket 21 and from thence up and around driving sprocket 17. This has the advantage of affording an additional 2 to 1 mechanical advantage for the reason that the extent of movement of the battery is only one half that of the chain passing over the periphery of sprocket 17. With this arrangement a lesser reduction in the gearing is required.

Figures 6 and 7 disclose an embodiment wherein a four point suspension of the battery is obtained rather than a two point suspension. A chain 18 is provided at each side of the battery cradle. The respective ends of the chain are secured to the battery cradle by means of hooks or the like as indicated at 24. Two driving shafts 9 are provided and each chain 18 is trained over the driving sprockets of each of the shafts 9 and a suitable amount of slack in the chain between the two sprockets is provided in order to permit of an adequate extent of movement of the battery. The driving shaft 13 carries two worms 12, one of which is provided with left hand threads and the other of which is provided with right hand threads. This is necessary in order to rotate the respective driving shafts 9 oppositely so that with the arrangement of the chain as shown each sprocket will serve to lift the battery upon rotation of the crank 16 in one direction and to lower the battery upon rotation of the crank in the other direction.

I prefer to arrange the pitch of the worm and worm wheel in such fashion that the weight of the battery will be sufficient to react through the gearing and cause the battery to descend under its own weight. This is desirable particularly to indicate to the operator that the regular means of attachment of the battery to the vehicle has not been secured in place. By thus arranging the mechanism, it is impossible for the operator to raise the battery into place and then proceed to drive the truck without first securing the regular battery supporting means in place.

With the apparatus of the present application it is possible to raise and lower the vehicle battery without the aid of a separate elevating device such as a special lifting truck or the like. The apparatus furnishes ready means for lowering the battery to a desired extent for inspection and returning it again into position. A principal advantage is that one person can readily handle the battery and can without assistance give all the attention to the battery which is necessary for inspection, charging and the like without necessity of expensive battery handling equipment.

I claim:

1. An electrically propelled vehicle comprising a battery furnishing driving power, a shaft positioned above said battery and a flexible member extending between said battery and said shaft, said flexible member being adapted to wind up upon rotation of said shaft.

2. An electrically propelled vehicle, comprising a storage battery for furnishing driving power, a shaft positioned above said battery, a sprocket provided on said shaft, a chain operating over said sprocket and means of attachment between said chain and said battery, whereby rotation of said shaft effects vertical displacement of said battery.

3. An electrically propelled vehicle comprising storage battery for furnishing driving power, a manually operated shaft positioned above said battery, said shaft being operated through the medium of reduction gearing, and means interconnecting said shaft and said battery for effecting movement of said battery upon actuation of the shaft.

4. An electrically propelled vehicle comprising a storage battery for furnishing driving power, a shaft positioned above said battery, a second shaft for driving said first mentioned shaft, means associated with said latter shaft for permitting manual operation thereof, reduction gearing interposed between said shafts, sprockets provided on said first mentioned shaft, chains operating over said sprockets and means of attachment between said chains and said battery, whereby movement of said battery results upon actuation of said shafts.

5. An electrically propelled vehicle comprising a storage battery for furnishing driving power, an actuating shaft, means interconnecting said shaft and said battery for shifting said battery upon operation of the shaft, means for effecting manual operation of said shaft and reduction gearing interposed between said means and said shaft, said reduction gearing being reversible under the weight of the battery.

6. An electrically propelled vehicle comprising a storage battery for furnishing driving power, an actuating shaft positioned above said battery, a sprocket provided on said shaft, a cooperating sprocket provided on said battery, a chain trained over said sprockets and having one end secured to said vehicle, whereby actuation of said sprocket carrying shaft serves to move said battery at a speed equal to one half that of the moving chain passing about the sprocket.

7. An electrically propelled vehicle comprising a storage battery for furnishing driving power, a pair of shafts mounted above said battery, reduction gearing for permitting manual operation of said shafts, sprockets provided on said shafts, a chain trained over the sprocket on each of said shafts, and means for attachment of said chain to the battery whereby actuation of said shafts effects displacement of said battery.

8. An electrically propelled vehicle comprising a storage battery for furnishing driving power, a pair of actuating shafts extending in parallelism above said battery, a manually operated driving shaft extending transversely of said actuating shafts, reduction gearing interposed between said driving shaft and said actuating shafts arranged to drive said actuating shafts in opposite directions of rotation, sprockets provided at the respective ends of said actuating shafts, a chain at each of the ends of said actuating shafts trained respectively over the sprockets provided at the two ends of said shafts, and means for attachment of the ends of said respective chains to the said battery, whereby actuation of said driving shaft effects vertical displacement of said battery.

In testimony whereof I affix my signature.

BENJAMIN H. BRITT.